United States Patent
Whitehead

(10) Patent No.: US 9,534,746 B2
(45) Date of Patent: Jan. 3, 2017

(54) HIGH-UNIFORMITY LIMITED-SPREAD POINT SPREAD FUNCTION LIGHT EMITTER

(71) Applicant: A.L. WHITEHEAD LTD., Vancouver (CA)

(72) Inventor: Lorne A. Whitehead, Vancouver (CA)

(73) Assignee: A.L. WHITEHEAD LTD., Vancouver (CA)

( * ) Notice: Subject to any disclaimer, the term of this patent is extended or adjusted under 35 U.S.C. 154(b) by 13 days.

(21) Appl. No.: 14/404,249

(22) PCT Filed: Jun. 4, 2013

(86) PCT No.: PCT/CA2013/000547
§ 371 (c)(1),
(2) Date: Nov. 26, 2014

(87) PCT Pub. No.: WO2013/181745
PCT Pub. Date: Dec. 12, 2013

(65) Prior Publication Data
US 2015/0167904 A1 Jun. 18, 2015

Related U.S. Application Data

(60) Provisional application No. 61/655,105, filed on Jun. 4, 2012.

(51) Int. Cl.
*G09F 13/04* (2006.01)
*G09F 13/08* (2006.01)
(Continued)

(52) U.S. Cl.
CPC . *F21K 9/54* (2013.01); *F21K 9/62* (2016.08); *G02F 1/133603* (2013.01);
(Continued)

(58) Field of Classification Search
CPC .............. G02F 1/133603; G02F 1/133605; G02F 1/133606; G02F 1/133611; G02F 1/133613; G09F 13/04; G09F 2013/222; F21Y 2105/003; F21K 9/54
See application file for complete search history.

(56) References Cited

U.S. PATENT DOCUMENTS 6,007,209 A 12/1999 Pelka
6,871,982 B2 * 3/2005 Holman ................. G02B 5/10
257/E33.072

(Continued)

FOREIGN PATENT DOCUMENTS

CA 2573689 A1 2/2006
EP 1596125 A1 11/2005
(Continued)

*Primary Examiner* — Peggy Neils
*Assistant Examiner* — Alexander Garlen
(74) *Attorney, Agent, or Firm* — The Salehi Law Group

(57) ABSTRACT

Simple yet powerful mathematical solutions are provided for producing a minimally-spreading de-pixelization light spread function with four-fold bilateral symmetry to create a High Dynamic Range LED-LCD display where the point spread functions of each LED regardless of intensity can be designed such that adjacent rows and columns of LEDs within an array blend smoothly and uniformly to create a non-pixelated continuous image in two dimensions on the diffuser screen and with minimal luminance overlap to minimize the computational demands required at video rate of an HDR display. The resulting image has substantially visually perfect uniform luminance, linear luminance and quadratic luminance gradient. Additionally a new display architecture is unveiled and described that emulates the mathematically developed light spread functions mentioned. This new architecture comprises several sub-aspects to tune the display device to the desired design requirements.

14 Claims, 16 Drawing Sheets

(51) Int. Cl.
    *F21K 99/00*     (2016.01)
    *G02F 1/1335*    (2006.01)
    *G09F 13/22*     (2006.01)

(52) U.S. Cl.
    CPC ........ *G02F 1/133605* (2013.01); *G09F 13/04*
        (2013.01); *G02F 1/133611* (2013.01); *G09F*
                                    *2013/222* (2013.01)

(56) References Cited

U.S. PATENT DOCUMENTS

| | | | |
|---|---|---|---|
| 2002/0034608 A1* | 3/2002 | Aeling | B32B 3/10 |
| | | | 428/137 |
| 2007/0165395 A1* | 7/2007 | Yang | G02F 1/133606 |
| | | | 362/97.3 |
| 2009/0097230 A1* | 4/2009 | Masuda | G02F 1/133606 |
| | | | 362/97.2 |
| 2012/0068615 A1* | 3/2012 | Duong | A01G 7/045 |
| | | | 315/192 |
| 2012/0127756 A1 | 5/2012 | Kim et al. | |

FOREIGN PATENT DOCUMENTS

| | | | | |
|---|---|---|---|---|
| WO | 2010035194 A1 | 4/2010 | | |
| WO | WO 2011025724 A1 * | 3/2011 | ....... | G02F 1/133605 |

* cited by examiner

HIGH-UNIFORMITY LIMITED-SPREAD POINT SPREAD FUNCTION LIGHT EMITTER

CROSS-REFERENCE TO RELATED APPLICATIONS

This application claims priority to U.S. Provisional Application No. 61/655,105, filed on 4 Jun. 2012. The entire contents of this provisional application are herein incorporated by reference.

BACKGROUND OF THE INVENTION

This application describes a new method of generating highly uniform, de-pixelated LED illuminated LED signs and back-lit HDR displays by employing a limited spread point spread function and new display architecture.

The human eye is sensitive to light over a very wide range of intensities. Human vision is capable of discerning contrast ratios of up to 1:10,000. That is, a person can take in a scene in which some parts of the scene are 10,000 times brighter than other parts of the scene and see details in both the brightest and darkest parts of the scene. Further, human vision can adapt its sensitivity to brighter or darker scenes over a further 6 orders of magnitude.

High Dynamic Range (HDR) Imaging is a technology developed to capture a greater dynamic range between the lightest and darkest areas of an image than current standard digital imaging or photographic technologies. The goal of HDR imaging is to achieve, as close as possible, a dynamic range that accurately reproduces real scenes as perceived by the human eye.

In a High Dynamic Range (HDR) display, an array of light emitting diodes (LEDs) lies behind a diffuser screen that in turn lies behind a color liquid crystal display (LCD). Each LED produces a luminance distribution on the diffuser screen of the form $L(x,y)$, where the coordinates x and y are measured on the diffuser screen from the location closest to the LED in question. More particularly, the location closest to the LED in question to the diffuser screen would have coordinates (0, 0). It is also possible for each of these LEDs to be composed of several sub-LEDs having different colors, such that the light on the diffuser screen can also have a spectral distribution that varies spatially. For example, the LED in question may be composed of sub-LEDs with the colors of red, green and blue (RGB). For simplicity in this application we will focus on the use of individual white LEDs, without limiting the use of these ideas to such monochrome application.

In prior art, often the luminance distribution L is a function that is maximum at zero, cylindrically symmetric, and decreases asymptotically toward zero in all directions. L is also called a point spread function (PSF). By selecting the distance between the diffuser screen and the LEDs, the effective width of the function L can be set to an optimal value, which is useful in trying to achieve intended design goals. For example, increasing the distance between the screen and the LED increases the effective width of the luminance distribution. This is well known in the field of HDR displays.

Unfortunately, there is a serious design conflict in selecting the width of such simple PSF functions. If the width is too narrow, the light from the LEDs will not blend to yield a uniform luminance distribution on the diffuser screen— there will be "hot spots" visible in front of each LED. "Hot spots" are the locations on the diffuser screen that are closest to the LED in question that have a relatively high luminance, which leads to noticeable bright spots. In other words, the display will appear non-uniform to the human eye, thus distorting the intended image. However, if the distance between the LED and diffuser screen is too large, the width of the luminance distribution of each LED cause it to decay too slowly with distance, which causes two problems. First, it is no longer possible to selectively illuminate only the region near a given LED, which reduces the display efficiency in some circumstances. Second, because of the spread, the luminance provided at any point on the diffuser screen comes from a large number of individual LEDs. This in turn leads to a large degree of luminance overlap of adjacent LEDs within the LED array. This is problematic, because, according to the principles of HDR displays, it is necessary to accurately predict the luminance level at each point on the diffuser screen. If many LEDs contribute to a single luminance point, this requires substantially more computation time, which is a significant issue because that calculation must be performed in real time for each video frame. With naturally occurring PSFs, this design conflict is a very significant problem that limits the practicality of high quality HDR displays.

The challenge is to provide a specially designed point spread function and display architecture for which the compromises listed above would be substantially less problematic. The invention described hereafter provides a solution for creating an HDR display with high efficiency and good image uniformity as a result of a specially designed PSF that produces uniform light at all points around an LED when blended with the light from immediately adjacent LEDs and provides minimal spread of light beyond the immediately adjacent LEDs in the array.

SUMMARY OF THE INVENTION

Accordingly, this invention provides in a first aspect a simple two-dimensional (2D) mathematical solution for a minimally-spreading de-pixelization light spread function (MSDPLSF) to create a display where the point spread functions of each LED regardless of intensity can be designed such that adjacent rows and columns of LEDs within an array blend uniformly to create a non-pixelated continuous image in two dimensions on the diffuser screen. In addition, minimal luminance spreading or overlap is also designed in to the mathematical solution such that the computational demands required at video rate of the display are kept to a minimum.

In another aspect, this invention provides a modified yet simpler and smoother minimally-spreading de-pixelization light spread function with smoother derivatives than that described in the first aspect.

In another aspect, this invention further provides a minimally-spreading de-pixelization light spread function for a 2d light emitting array that has four-fold bilateral symmetry of an LED array where most of the light is emitted within the cell of origin and that the pattern is consistent with producing substantially visually perfect uniform luminance, linear luminance gradient, and quadratic luminance gradient.

In another aspect, this invention describes a new display architecture that emulates the mathematically developed light spread functions mentioned in the preceding paragraphs. This new architecture comprises several sub-aspects to tune the device to the desired requirements.

DETAILED DESCRIPTION OF THE INVENTION

Figure 1:
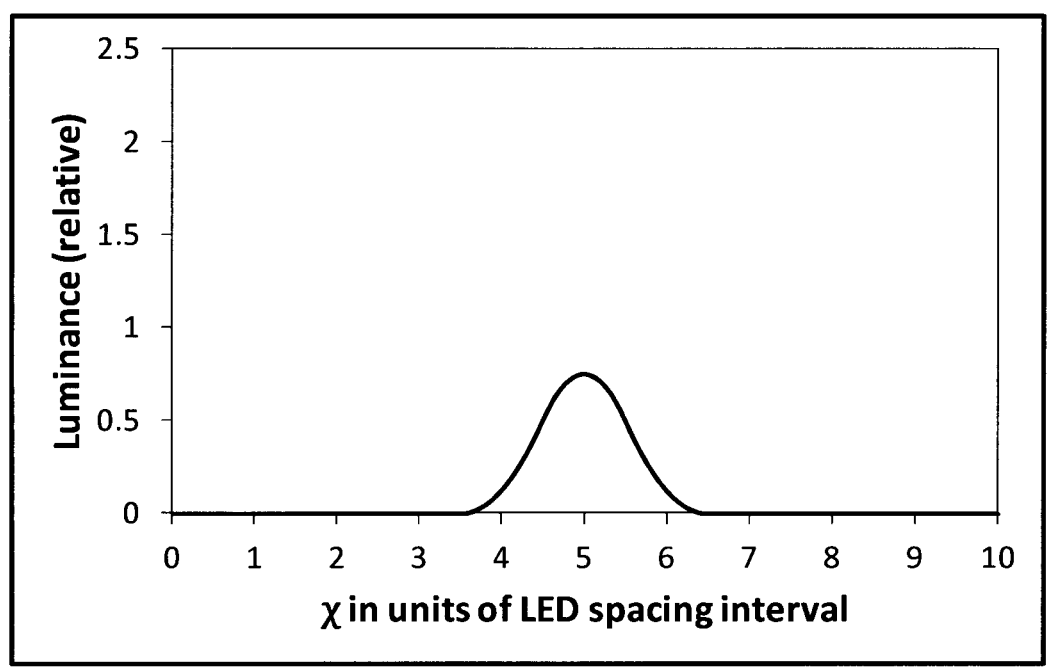
FIG. 1 of the accompanying drawings shows a single illuminated LED illustrating the basic shape of the point spread function in Expression (1)

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The following description is divided into two parts. The first part described in Section A is a mathematical development of the invention that develops a "minimally-spreading de-pixelization light spread function for a 2d light emitting array", somewhat in analogy to numerical de-pixelization techniques used in digital image up-sampling. This involves three successive versions of this concept for the purpose of aiding practical and efficient emulation of the design in practical optical structures. The second part in Section B, a display architecture for emulating the "minimally-spreading de-pixelization light spread function for a 2d light emitting array" in a practical system is described.

Section A: Minimally-Spreading De-Pixelization Light Spread Function (MSDPLSF)

Considering a 1D case, in which by definition there is an LED spacing interval of 1 unit, and in which the LEDs, when uniformly illuminated at their nominal power, would yield an average screen luminance of 1 unit. A point spread function (PSF) can be designed which is exactly 0 for values of x beyond a certain defined cut off distance and that within the non-zero region the function would have non-zero curvature at most points. Because discontinuities in curvature must not be present when all LEDs are on, this in turn implies that the cut-off value of x, beyond which L is zero, would need to be either an integer or half-integer value. This way the right cut-off edge of one distribution would match up with the left cut-off edge of another, and together this match would ensure continuity of curvature across the cut-off edges leading to a uniform image. In other words, the cut off value, in LED-interval units, could be 0.5, 1.0, 1.5, 2.0, etc. It is desirable for this value to be as low as possible to prevent luminance points on the diffuser screen from being comprised of light from a large number of LEDs, and yet subject to the constraint that there be sufficient overlap of the PSF functions of the LEDs to achieve the optical uniformity design goals.

Using this conceptual approach, there are three desirable mathematical goals for an optimal PSF:

a) When all LEDs are uniformly lit, the diffuser luminance should be perfectly uniform.

b) When the LEDs are illuminated with a linear gradient (with the intensity of the form I=a+bn where a and b are constants and n is the LED number in the sequence) then it is desirable for the diffuser luminance to have the form I=a'+b'x where a' and b' are constants and x is position on the diffuser.

c) When the LEDs are illuminated with a quadratic gradient (with the intensity of the form I=a+bn+cn$^2$ where a, b, c are constant and n is the LED number in the sequence) then it is desirable for the diffuser luminance to have the form I=a'+b'x+c'x$^2$ where a', b', c' are constants.

The net result of this mathematical analysis is that it is not possible to achieve this for a cut-off value of 0.5 (this is actually obvious because there is no overlap in this case) and it is also not possible to do so with a cut-off value of 1 (the only function satisfying requirement (b) above fails to satisfy requirement (c) above). However, for a value of 1.5, there is at least one solution that achieves all three goals. This solution is formed from multiple juxtaposed quadratic functions, though this may not be a fundamental requirement—slight variations from this basic design concept can also satisfy the above three criteria for such an MSDPLSF and any such function is intended to fall under this basic invention idea. This possibility will be explored later with a more sophisticated embodiment.

Using the characterization described above, the function is described below in three different regions of x-values. These sub-functions combine to yield a function that integrates to unity and for which both the function and its first derivative are continuous at all points—an essential condition for a function that is to be physically realized. The function is defined as follows in Expression (1).

$$\text{for } |x| \le \frac{1}{2}, L(x) = \frac{3}{4} - x^2 \quad (1)$$

$$\text{for } \frac{1}{2} < |x| \le \frac{3}{2}, L(x) = \frac{1}{2}\left(|x| - \frac{3}{2}\right)^2$$

$$\text{for } |x| > \frac{3}{2}, L(x) = 0$$

Figure 2:
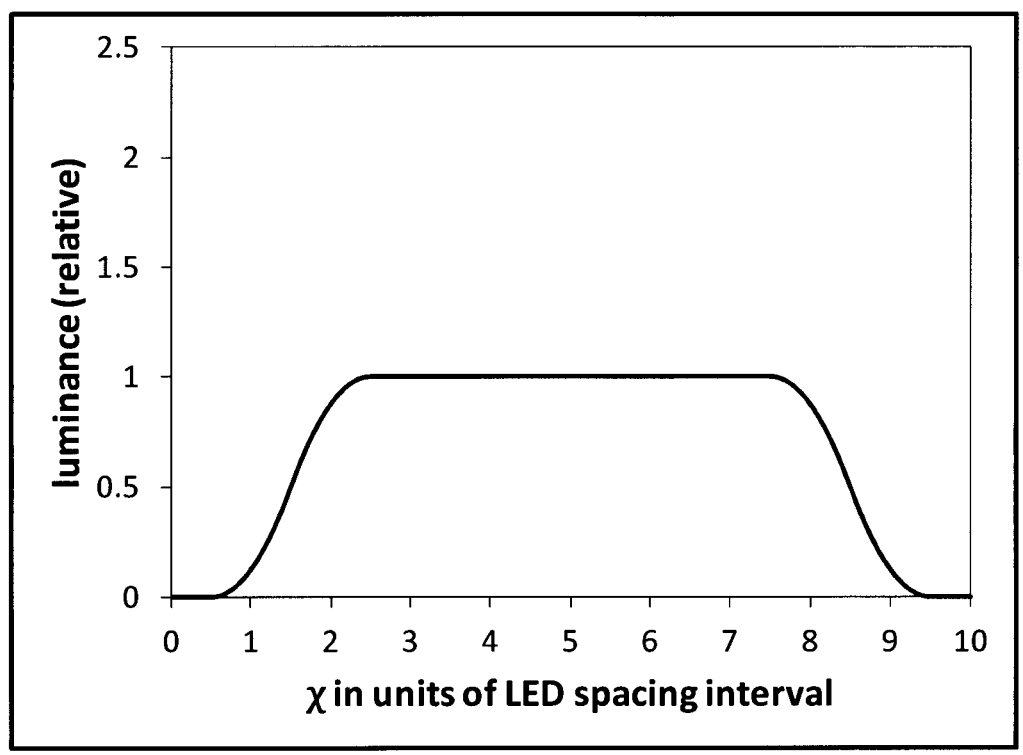
FIG. 2 of the accompanying drawings shows a row of 7 LEDs uniformly illuminated and summing to uniform luminance.
Figure 3:
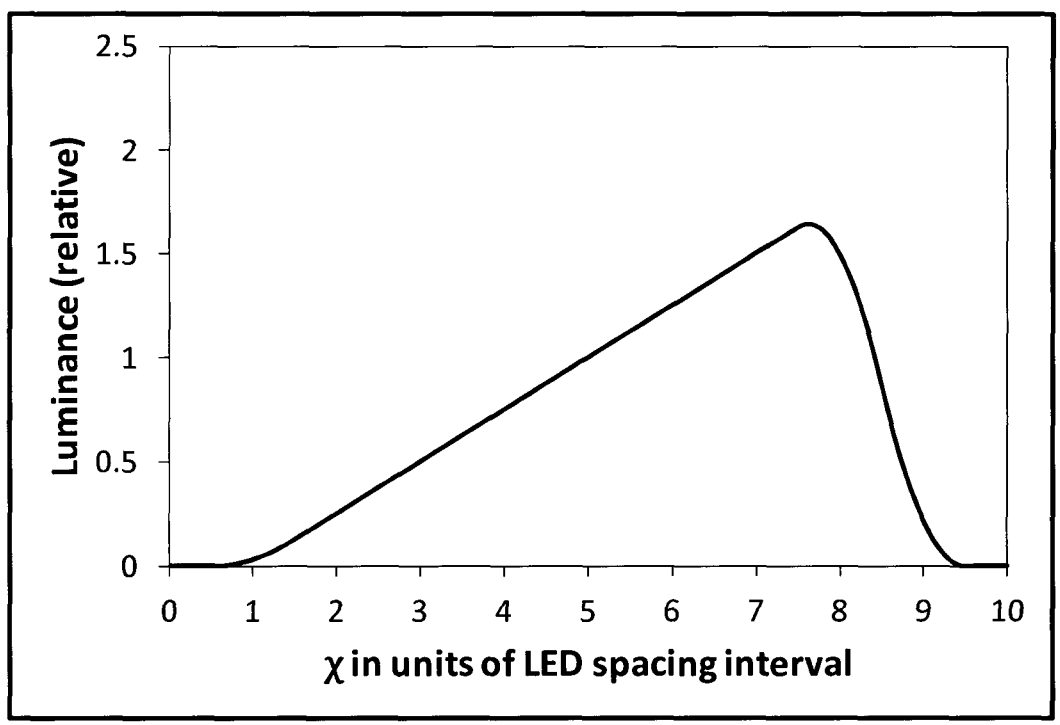
FIG. 3 of the accompanying drawings shows a row of 7 LEDs illuminated in a linearly increasing gradient showing a linearly increasing luminance.
Figure 4:
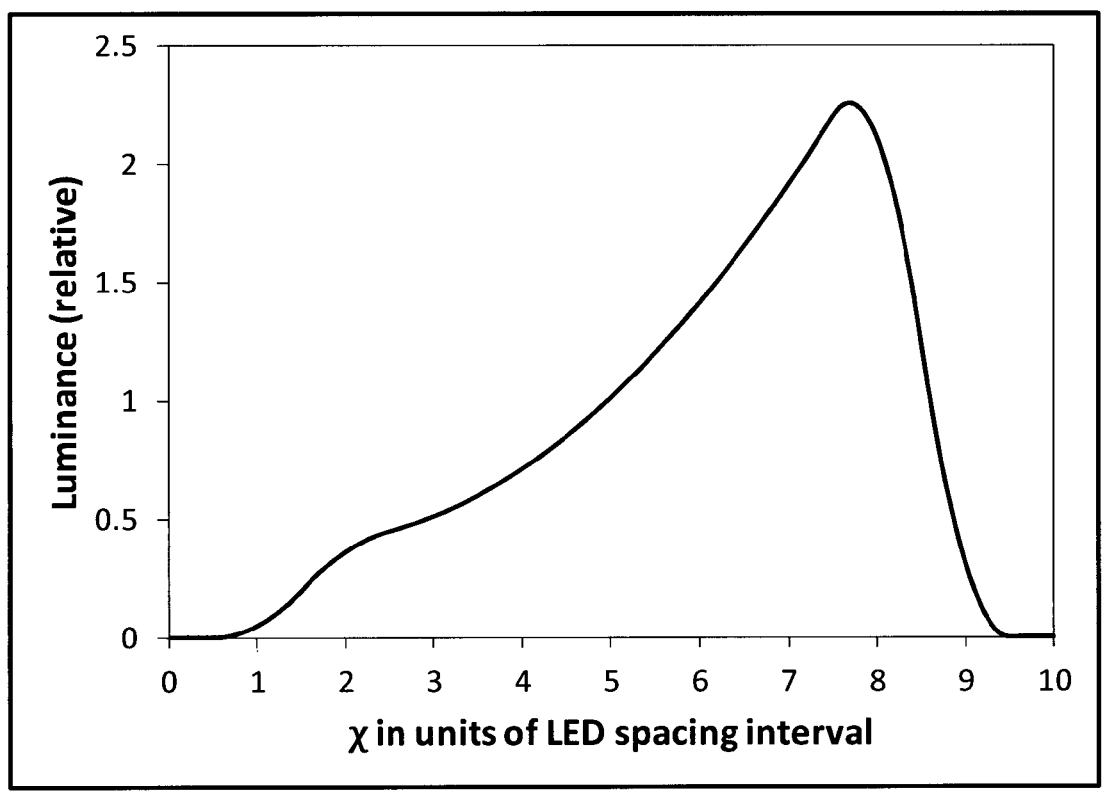
FIG. 4 of the accompanying drawings shows a row of 7 LEDs illuminated in an increasing quadratic gradient showing a quadratically increasing luminance.

As already mentioned, this function also achieves all of the criteria listed above. This is illustrated in FIGS. 2, 3 and 4, in which 7 LEDs in a row are illuminated using this function with various intensity multipliers for the LEDs.

In the first plot in FIG. 1, only the center LED is on (LED #5), so that the result is a depiction of the shape of a single PSF. In FIG. 2, a row of 7 LEDs are on (LEDs 2-8) with a unity multiplier, yielding unity luminance as shown. In FIG. 3, a linear gradient is used such that the intensity of each subsequent LED from LEDs 2-8 increases in intensity in a step-wise manner but by the same amount. More particularly, the luminance increases by, for example, 0.5 units from LED #2 to LED #8 (i.e. 1, 1.5, 2, 2.5, 3, 3.5 and so forth). In FIG. 4 a quadratic gradient is used such that the intensity of each subsequent LED from LEDs 2-8 increases in intensity in a step-wise manner but in a quadratic fashion (i.e. $1^2$, $2^2$, $3^2$, $4^2$ and so forth). In all these cases, regardless of the intensity multiplier, the key characteristic is that the existence of the underlying LEDs is "hidden" by the smoothing effect of the function, and yet, remarkably, the light from each LED extends no further than 1.5 units away from it.

In actual HDR imaging, there is a need to achieve all of the above benefits in a two dimensional array. This may be possible in more complicated arrays, but for demonstration purposes we consider the common case of a square array pattern of LEDs in which the LEDs are in evenly spaced rows and columns.

The most straightforward generalization to two dimensions is shown in Expression (2) where L(y) has the same functional form as L(x).

$$L(x,y)=L(x)L(y) \quad (2)$$

This function achieves the same result as above for a uniform array, in the case of a linear gradient in either the x or y directions, and also in the case of a quadratic gradient in the x or y directions. If fact, it turns out that this also works well for gradients in any direction, which means that this function can produce smoothly varying luminance distributions on the diffuser screen that never "reveal" the underlying location of the discrete LEDs despite the fact that the light from any given LED propagates a distance no greater than 1.5 lattice units. From a computational point of view, this means that any given pixel on the LCD receives a light contribution from at most 8 immediately adjacent LEDs which is a huge computational advantage of this invention.

Interestingly, but perhaps not surprisingly, this 2D PSF is not circularly symmetric. Instead, and as would be expected, it has the four-fold symmetry associated with a square array of LEDs. Although it will not be described in this application, one could envision PSFs that could be developed and applied to LEDs and other electric light sources, for example, in a hexagonal array with six-fold symmetry.

One interesting mathematical consideration is that there is often a desire to use the intensity settings of the LEDs that match, as accurately as possible, the intensity of the desired image. Actually, it is more correct to say that there is an ideal intensity to match and often it is approximately proportional to the square root of the intended HDR image intensity, integrated over the area associated with each LED. From this perspective, the spread of light from the LEDs adds a level of blur in the luminance distribution that makes this somewhat difficult. This problem is uncorrectable for the large width PSFs that are normally used. However with this new design, the spread is so small that the effect of the added blur can largely be pre-corrected by applying a "sharpening kernel" to the array of desired image values in order to obtain a matrix of LED values which, after blurring, yields the desired image. The only drawback is that in some extreme cases such a calculation yields negative intensity values for certain LEDs, which is not physically realizable. Nevertheless, it is an important added advantage of this PSF that such pre-conditioning is possible and can yield minimally distorted luminance distributions on the diffuser screen.

As mentioned previously, it is likely that variations of the above described point spread function could be advantageous by being more practical to make in simple optical systems. Such considerations led to the development of an alternate function defined in Expression (3).

$$\text{for } |x| \le \frac{1}{2} L(x) = \frac{13}{16} - \frac{3}{2}x^2 + x^4 \quad (3)$$

$$\text{for } \frac{1}{2} < |x| \le \frac{3}{2} L(x) = \left(\frac{3}{2} - |x|\right)^3 - \frac{1}{2}\left(\frac{3}{2} - |x|\right)^4$$

$$\text{for } |x| > \frac{3}{2} L(x) = 0$$

Figure 5:
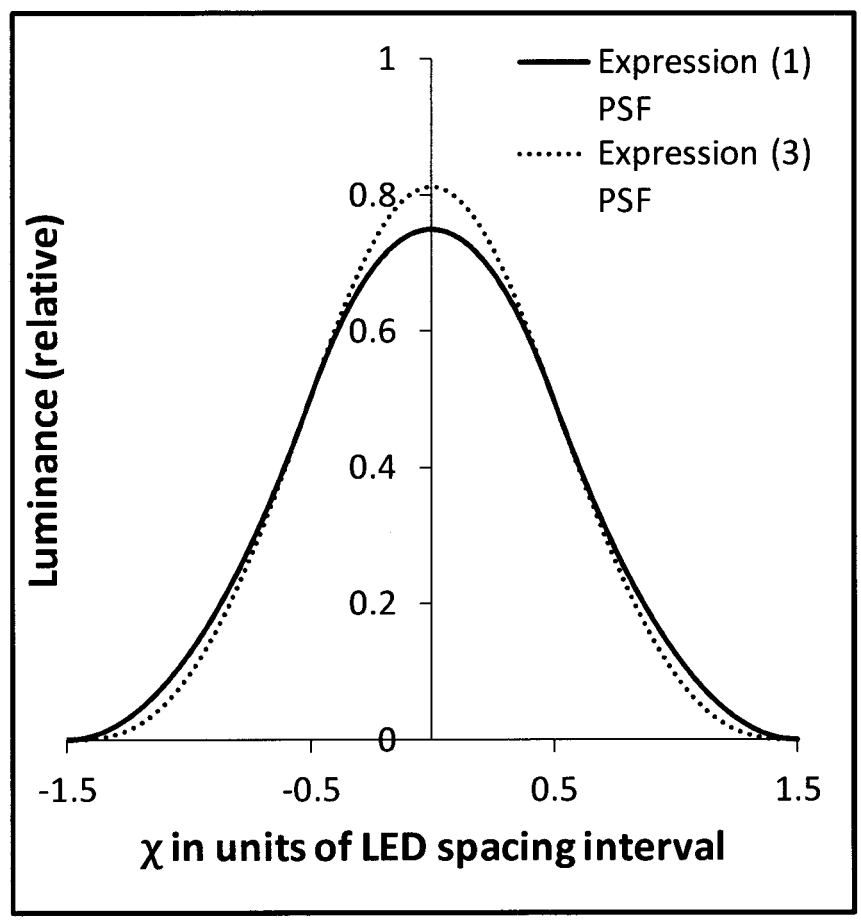
FIG. 5 of the accompanying drawings shows a single illuminated LED comparatively illustrating the basic shapes of the point spread functions from Expressions (1) and (3)

The single LED point spread function (PSF) described in Expression (3) is shown alongside the single LED PSF previously described in Expression (1) in FIG. 5 for comparison. As can be seen, the PSF from Expression (3) has a slightly higher peak, but basically it behaves in a fairly similar manner to the PSF from Expression (1), however, it is probably considerably simpler to actually make. Simple optical systems tend to produce light distributions with smoother derivatives and the PSF from Expression (3) is better from this perspective.

Figure 6:
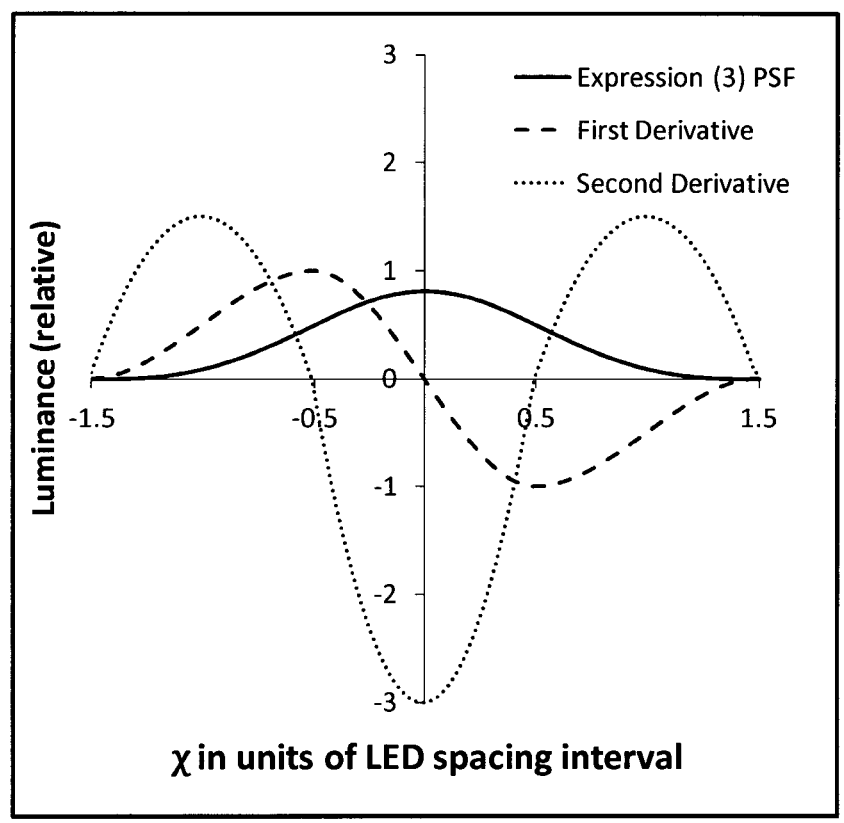
FIG. 6 of the accompanying drawings shows a single illuminated LED point spread function of Expression (3) along with its first (dashed line) and second (dotted line) derivatives.

The smoother function described by Expression (3) is further illustrated by showing its first derivative (dashed line) and its second derivative (dotted line) in FIG. 6.

A further generalization can be achieved by breaking the function down, both mathematically, and optically, into a first cylindrically symmetrical characteristic and a second characteristic that exhibits the underlying symmetry of the LED array, which is four-fold for the square LED array primarily considered here but could, for example, be six-fold if a hexagonal array of LEDs were employed.

Again, consider a two dimensional rectangular array of light sources with a unit cell spacing of 1.0. The spacing from the plane comprising the light sources to the screen is roughly half a cell unit; the precise number is a design variable which will be determined based on the requirements of the display.

Next, define two intensity functions of the 2D position on the screen, which will be multiplied together to yield a point spread distribution function of x, y. A successful point spread function cannot be circularly symmetric in a system with 4-fold symmetry such as a square array of LEDs. A key idea here is to select a first function that is cylindrically symmetric, which can be produced by physical effects that naturally tend toward that form of symmetry, and a second function that has the same symmetry as the LEDs and can be produced by physical effects having that same inherent symmetry. This will become clear as the functions are described herein.

The first, R(x,y), represents a realistic illuminance profile arising from a circularly symmetrical light source that has its output distributed over a region that is a significant portion of the unit cell. The estimated form is similar to that of a Lambertian point source illuminating a screen. However, for a point source, the exponent power would be larger; but with an extended source a somewhat lower exponent may be more representative. It's also potentially helpful that this is a simple function, as a starting point as shown in Expression (4).

$$R(x,y)=(1+3x^2+3y^2)^{-1} \qquad (4)$$

Figure 7:
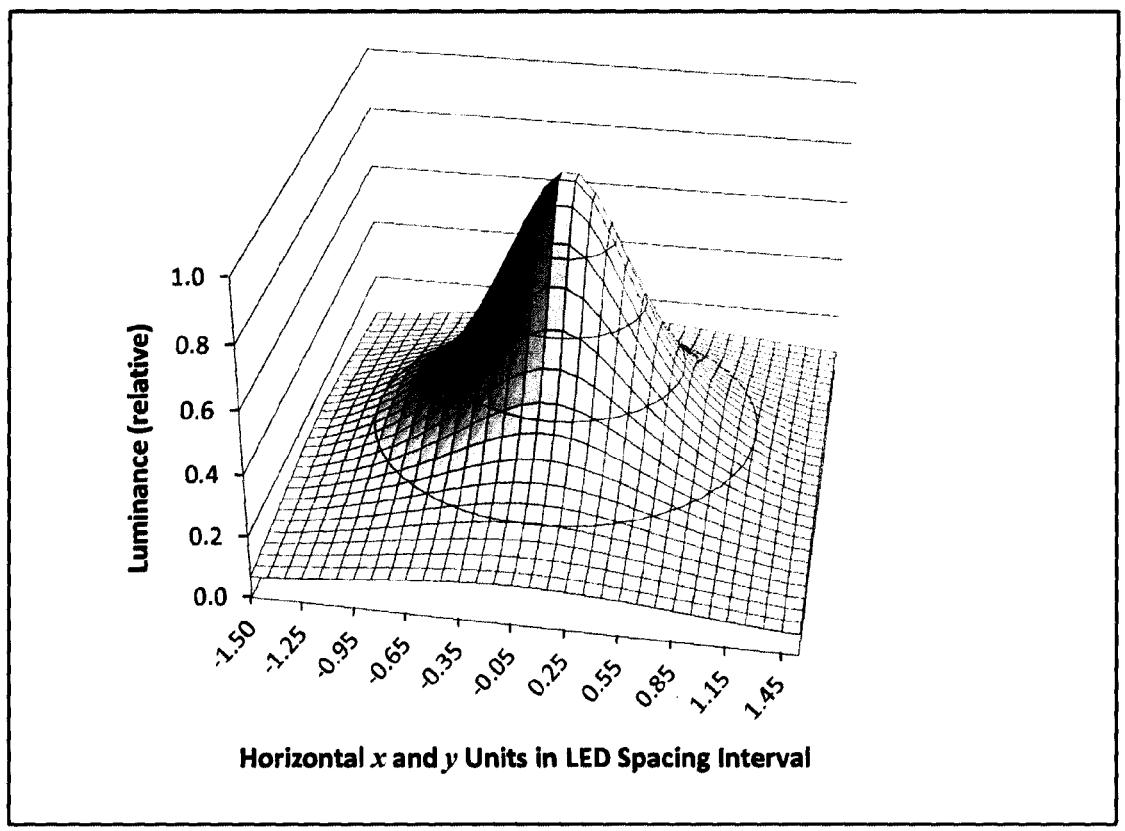
FIG. 7 of the accompanying drawings is a three dimensional plot showing R(x,y) (vertical axis) vs x,y (interchangeable horizontal axes)

The distribution of the illuminance profile from a singularly symmetric light source as mathematically described by Expression (4) is shown graphically in FIG. 7.

Throughout this description, the focus is on the range of locations associated with a unit cell, and the 8 cells that surround it. They are contained within the dimensional range $-1.5<x<1.5$ and $-1.5<y<1.5$. It is desirable for high contrast and sharpness to limit all of the light from a source to this range, and as shown in FIG. 7, the simple function R(x) fails this test as quite a bit of light falls outside this range. On the positive side, about half the light falls within the unit cell. This is about the right amount for optical de-pixelization without substantially blurring the image. It's important to note that R(x) won't be perfect but the goal is to show that it can get very close to yielding a reasonable result in combination with the second multiplier function.

R(x), by itself, also fails another test. It is not a proper point spread function for image smoothing. If used alone, the adjacent distributions do not add to give a smooth function. Additionally it is known from previous work that circular symmetry cannot work for this. So it is necessary to modify the function from both of these perspectives.

The proposed modification function is called here T(x). It has the following form as shown in Expression (5).

if $|x| \leq 0.5$ $T(x)=1$ if $1.5 \geq |x| > 0.5$ $T(x)=0.5+1.875(1-|x|)-5(1-|x|)^3+6(1-|x|)^5$ (5)

if $|x| \geq 1.5$ $T(x)=0$

This function translates from 1 to 0 over an x-value range from 0.5 to 1.5 and it does it very smoothly with zero slope and zero curvature at each end of the range, which is important to avoid visual artifacts. Likely this is the simplest mathematical function that has these features. Define T(y) in the obviously analogous way and define the combined truncation function T(x,y) as their product as shown in Expression (6).

$$T(x,y)=T(x)T(y) \qquad (6)$$

Figure 8:
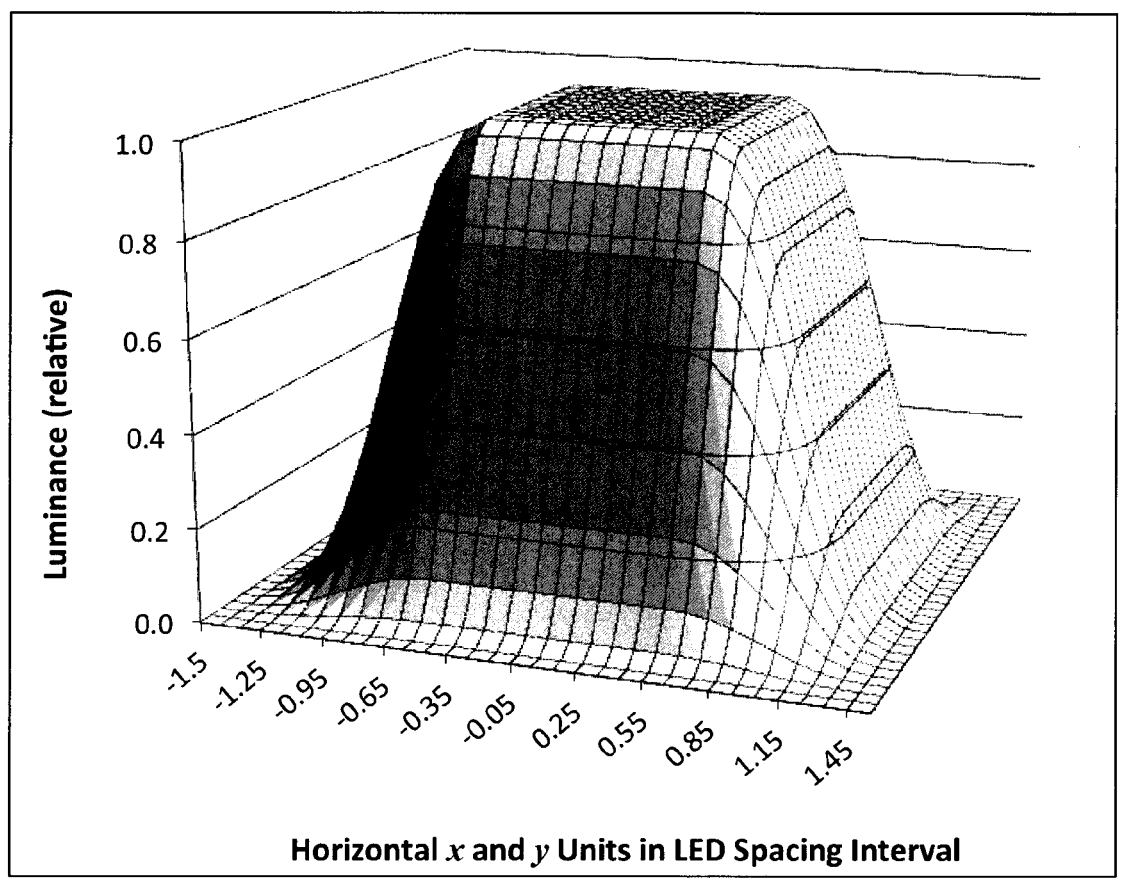
FIG. 8 of the accompanying drawings is a three dimensional plot showing T(x,y) (vertical axis) vs x,y (interchangeable horizontal axes)

The plot shown in FIG. 8 depicts this smooth truncation distribution function graphically in three dimensions, which is zero outside the area of interest. This feature is very important to minimize the spread of light, and to maximize display contrast.

One of the desirable features of this function is that it can approximately be created physically in a display architecture by baffles that extend halfway from the plane comprising of the light sources to the diffuser plane, and are located equidistantly between the rows and columns of the light sources. If the light sources were point sources, the illuminance pattern would appear like a sharpened version of FIG. 8, and if the light sources were very broad, they would yield a blurred version of FIG. 8. Thus, FIG. 8 has characteristics that may be practical to achieve with practical baffles and light sources of practical size.

The two functions R(x,y) and T(x,y) can be multiplied together to obtain the resultant point spread function shown in Expression (7).

$$P(x,y)=R(x,y)T(x,y) \qquad (7)$$

Figure 9:
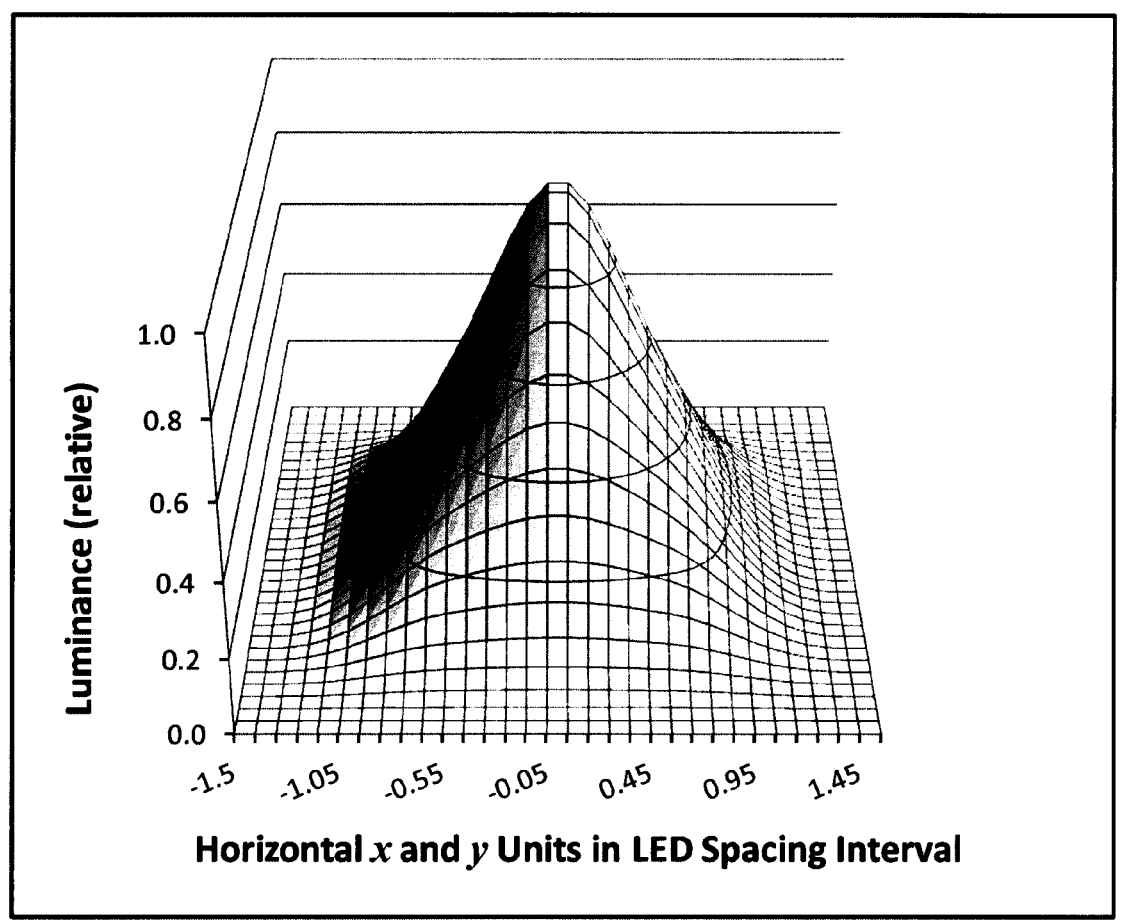
FIG. 9 of the accompanying drawings is a three dimensional plot showing the new point spread function, P(x,y) (vertical axis) vs x,y (interchangeable horizontal axes). The horizontal range is from −1.5 to 1.5 for each axis, a 3×3 array of unit cells.

This combined function has all the desired features for a point spread function for optical de-pixelization. It probably will not be mathematically perfect, but it only needs to be "visually perfect" under typical viewing conditions. FIG. 9 graphically depicts this combined point spread function in three dimensions.

Figure 10:
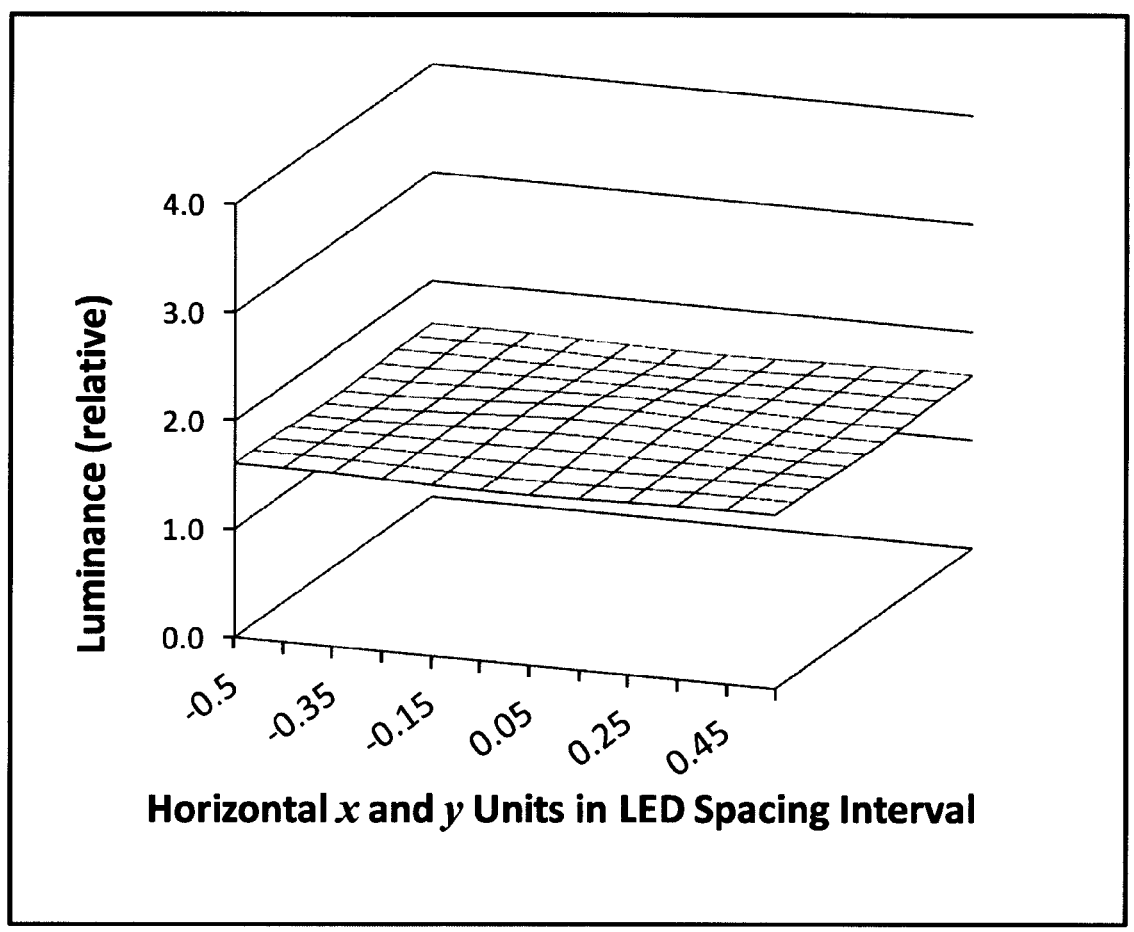
FIG. 10 of the accompanying drawings is a three dimensional plot of the unit cell illuminance I(x,y) (vertical axis) vs x,y (interchangeable horizontal axes) showing a uniform light source intensity distribution of surrounding cell units.

To evaluate this function, mathematically one can calculate the resultant light in the central unit cell which, by virtue of the PSF truncation feature, will arise only from that cell's source and those in the surrounding 8 adjacent cells. In the plot shown in FIG. 10 the range of x is from −0.5 to 0.5 and similarly for y. This was done first for the case in which the sources are uniformly illuminated which yielded a uniformly illuminated distribution in the test cell as shown graphically in FIG. 10.

Figure 11:
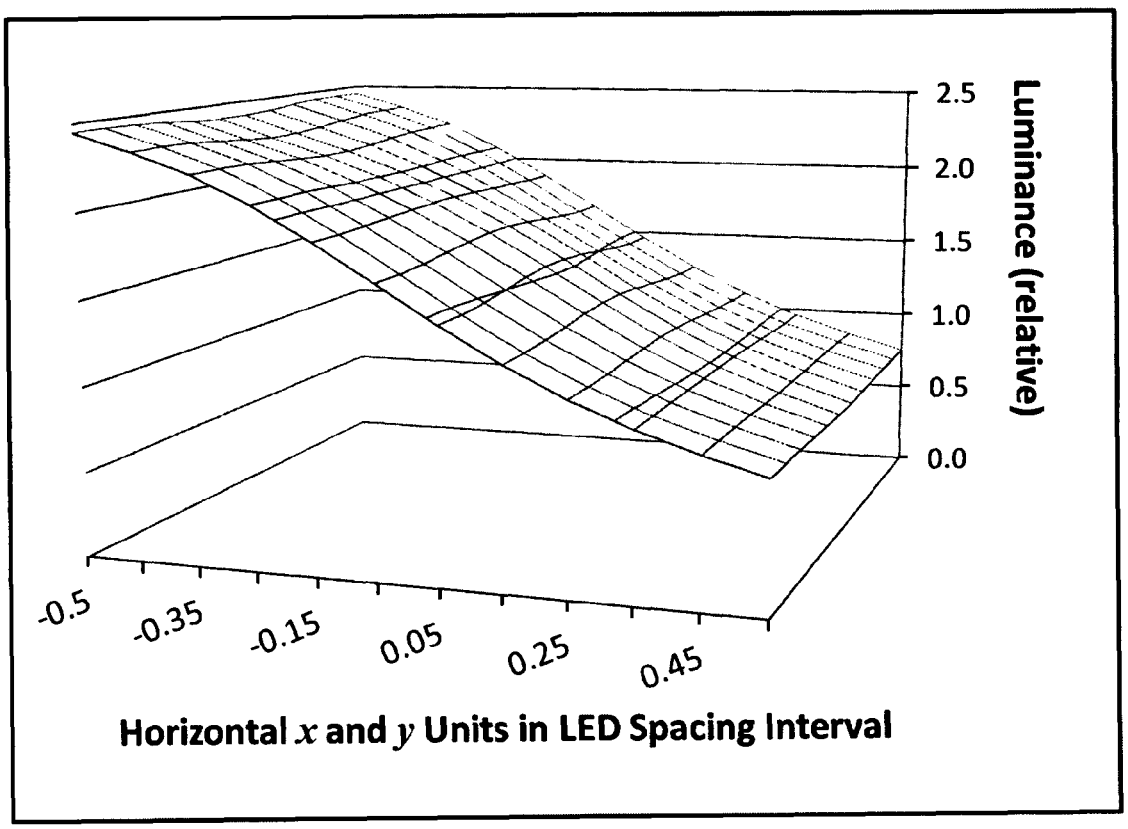
FIG. 11 of the accompanying drawings is a three dimensional plot of the unit cell illuminance I(x,y) (vertical axis) vs x,y (interchangeable horizontal axes) exhibiting a uniformly linear gradient in light source intensity.

Next a linear intensity gradient was created by having three cells with lower x value having an equal lower intensity than those in the middle, and opposite for the three cells with higher x value. As desired, the result is a fairly linear and uniform gradient as shown in FIG. 11.

Figure 12:
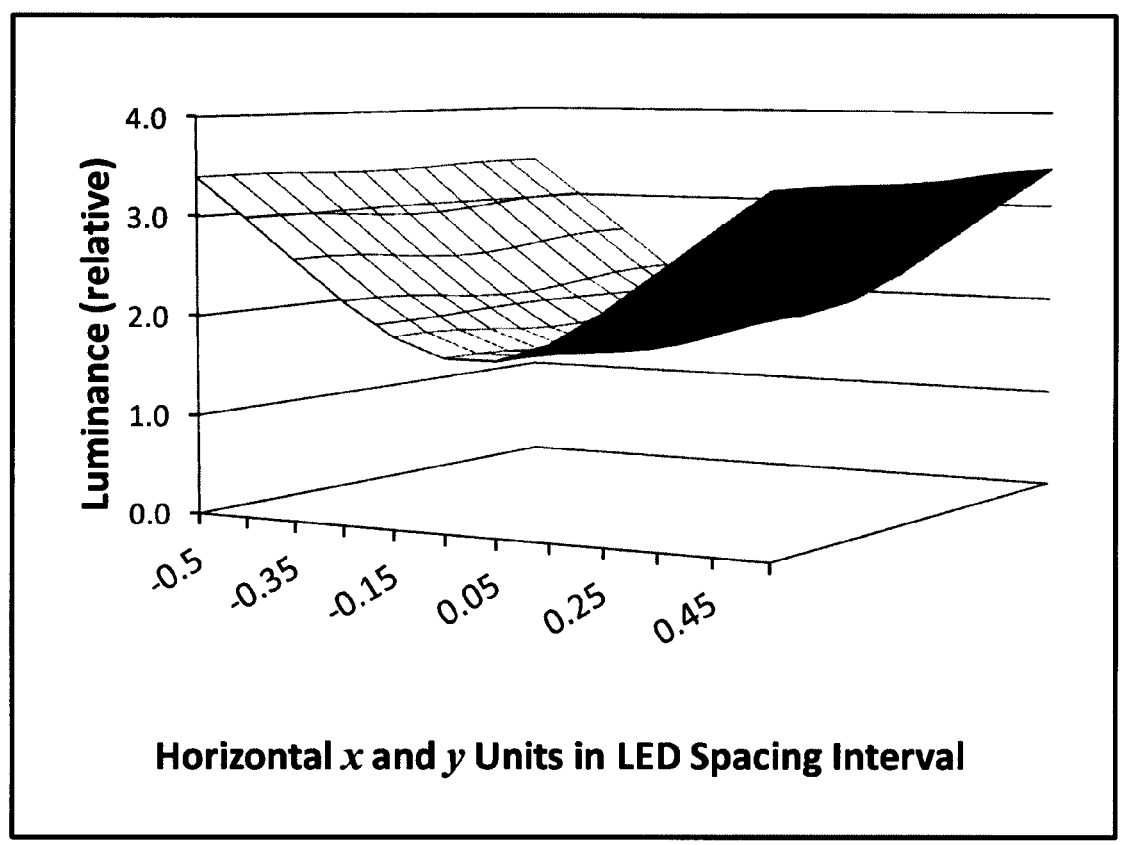
FIG. 12 of the accompanying drawings is a three dimensional plot of the unit cell illuminance I(x,y) (vertical axis) vs x,y (interchangeable horizontal axes) exhibiting a uniform quadratic gradient in light source intensity.

Next the "lower x" and "higher x" cells were modified so that they were all equally more positive in intensity than the center in order to simulate a quadratic gradient. The result was also quite good showing a uniform gradient as shown in FIG. 12.

The purpose of demonstrating these three mathematical approaches is to show that functions that look quite different from an algebraic point of view can be quite similar numerically and can achieve the same goal, believed to be defined here for the first time, of being a "minimally-spreading de-pixelization light spread function for a two dimensional light emitting array" (MSDPLSF). Characteristics of this function are that it is not circularly symmetric but rather it has the four-fold bilateral symmetry of the array, that most of the light is emitted within the cell of origin, that very little of it is emitted far from the cell of origin, and that the pattern is consistent with producing substantially visually perfect uniform luminance, linear luminance gradient, and quadratic luminance gradient. This pattern itself is believed to be new and unique, and that embodying this behavior into a unique physical system is a patentable reduction to practice of this concept.

Section B: Practical Display System for Emulating the Minimally-Spreading De-Pixelization Light Spread Function for a 2D Light Emitting Array A major breakthrough of the inventions discussed in this application is that by using practical optical components, a 2D light emitting array display architecture can be assembled such that it emulates the minimally spreading de-pixelization light spread point function presented herein. To prove this, an optical simulation was performed in a simple geometry consisting of black baffles aligned exactly as described previously, with the light source within each cell being an array of Lambertian emitters than can have any intensity distribution as a function of position within the cell. The idea is that by varying that distribution, it would be possible to tune the resultant illumination on the screen to achieve the desired results. The distribution has two effects. First, it affects the primary distribution within a given cell arising from its own light emitting source and second, it changes the mathematical profile of the "blurred shadows" of the baffles. The hypothesis evaluated here is that there could exist a 2D distribution that would achieve the right combination. The proceeding analysis is a first test of the feasibility.

The calculation itself is a simple radiation transfer calculation based on the Lambertian emitter geometry, the cosine factor for Lambertian emission and also for incidence of light on a plane, as well as the well-known inverse square law. Using a general optimization algorithm, the spacing to the screen was allowed to vary as well as the intensity distribution of the source. The optimization parameter included uniformity in the case of uniform source power, uniformity of gradient in the case of a linear gradient of light source intensity, and uniformity of curvature in the case of a quadratic gradient of light source intensity. The optimization process was successful. The system evaluated a source distribution with 10×10 array of light emitter points comprising 15 degrees of freedom, and a unit cell for assessment comprising an 11×11 array. For calculation, the baffle was assumed to be totally black.

The result achieved a fractional uniformity level of 0.3%, which should be invisible to a viewer, as well as smooth linear and quadratic gradients. The selected spacing from the light sources to the screen was 0.65 unit cells, such that the height of the baffles would be 0.325 unit cells.

Figure 13:
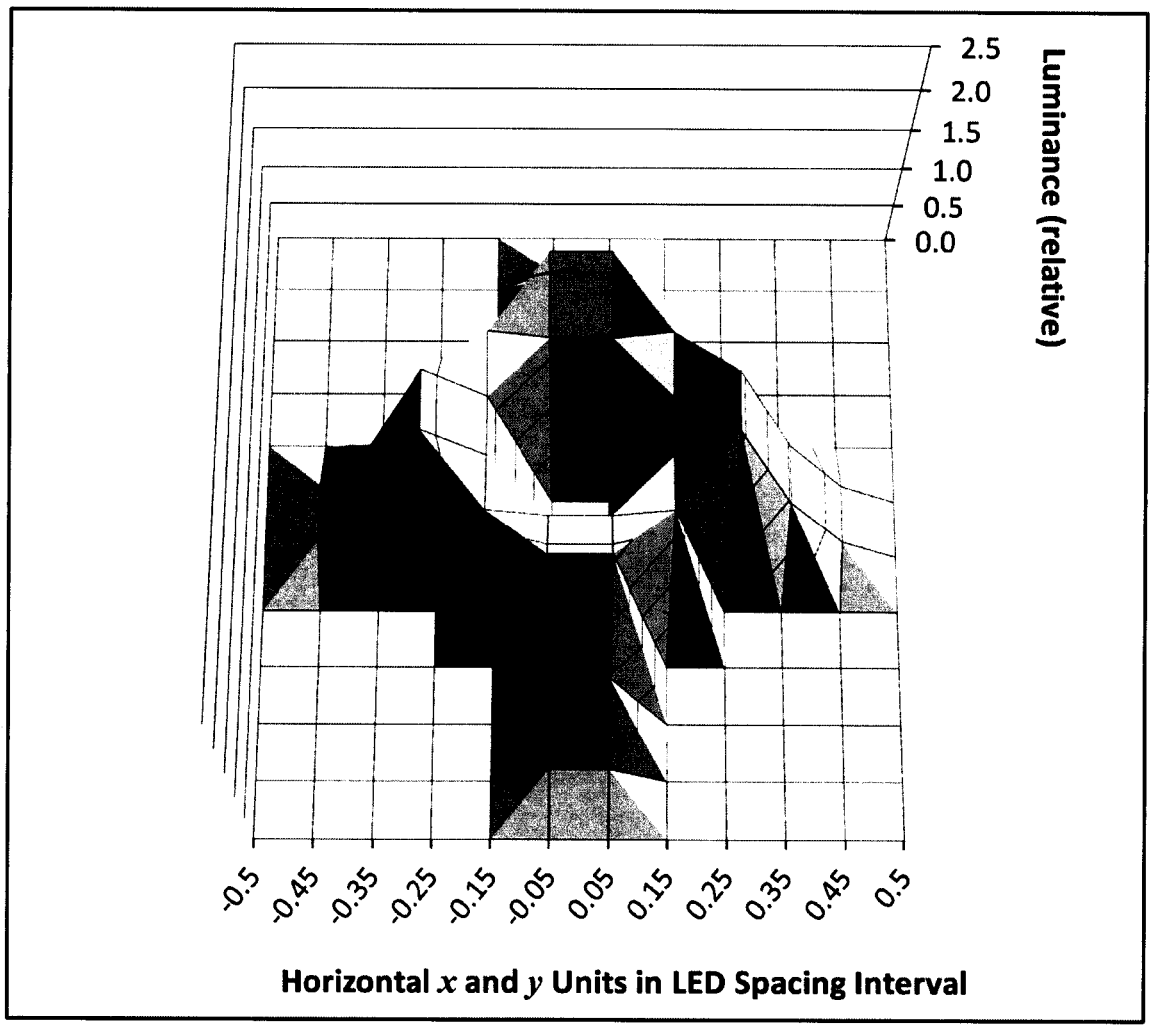
FIG. 13 of the accompanying drawings is a three dimensional plot of an optimized unit cell source distribution I(x,y) (vertical axis) vs x,y (interchangeable horizontal axes) for an optimized screen distance of 0.65 unit cells.

The intensity distribution of the source light in the unit cell is very interesting, as shown in FIG. 13. In FIG. 13 is shown an optimized unit cell source distribution I(x,y) for an optimized screen distance of 0.65 unit cells. The pattern is much like a glowing ring with a radius of 0.25 unit cells.

Here again the 3D plot is with the unit cell with horizontal axes x ranging from −0.5 to 0.5 and similarly for y. This is a very interesting distribution especially because it should be very easy to create such a distribution by scattering light from a central LED, off of a small reflective disk and back onto the surrounding region around the LED.

As expected there would be some light lost due to the baffles. If they are diffusely reflective, the energy loss would be quite low, but there would be more light spread. If they are made highly absorptive, the loss would probably still be acceptable, because the baffles are small and aligned with the dominant light flow direction. Various embodiments of the baffle construction are envisioned such as, for example, a slightly curved or flat geometry in combination with a reflective or even retro-reflective surface coating or structure. A new display architecture is proposed in the following paragraphs that will better illustrate the baffle invention discussed herein.

Figure 14:
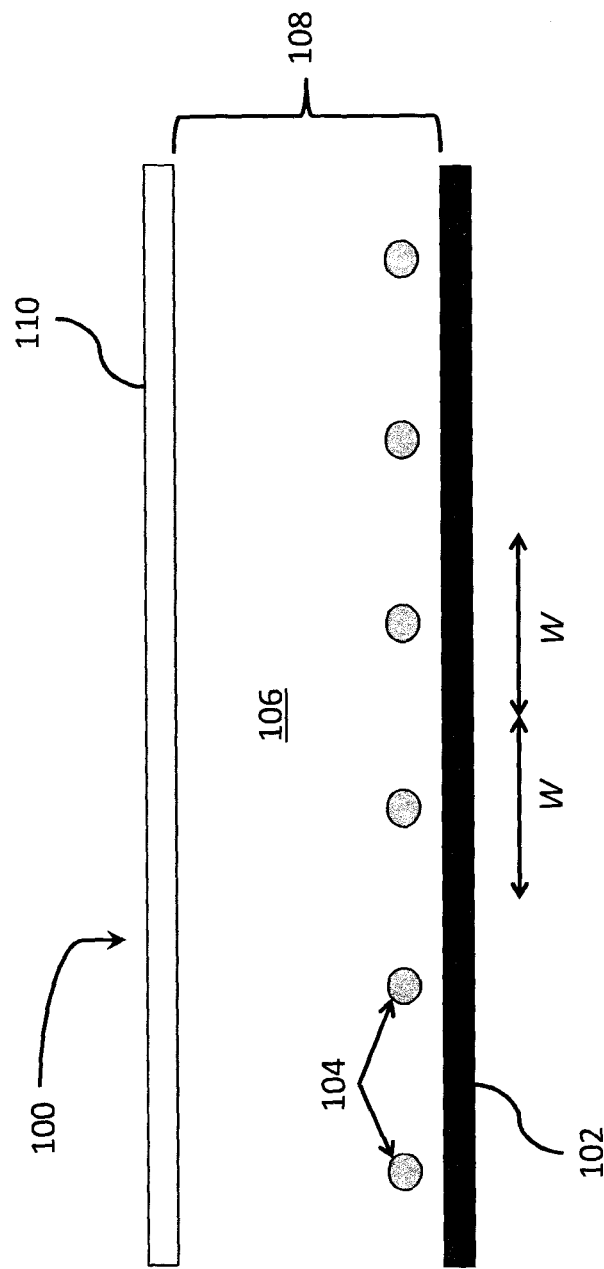
FIG. 14 of the accompanying drawings is a greatly enlarged, not to scale, cross-sectional side elevation view of prior art of an emissive display.

A schematic cross-section of the current state-of-the-art for typical emissive display devices is shown in FIG. 14 as an example of prior art. This display device, generally designated 100, comprises a backplane support 102 and a plurality of arrayed light sources 104 adjacent to the backplane 102 contained within a cavity of air or an optically clear material designated 106. Atop cavity 108 is an outer or front sheet 110 comprised of a diffuser screen with Lambertian transmission properties on which a 2D image is illuminated and viewed by a viewer. The unit cell width, designated W, and labeled with a double-headed arrow of the display type 100 is illustrated in FIG. 14. With this type of display, a large degree of mixing of the spread from each individual light source would result leading to blurred images and poor contrast, which would increase as the gap between light sources 104 and front Lambertian diffuser screen 110 is increased. Also it becomes very difficult to calculate the luminance level at video rate of each point on the diffuser screen per HDR technology requirements. If the distance between diffuser screen 110 and light sources 104 is too small, "hot spots" are created leading to a dis-uniform display. The following embodiment of a display architecture illustrates a design of a practical optical structure that minimizes overlap of the point spread from each light source yet leads to a smoothly uniform display.

Figure 15:
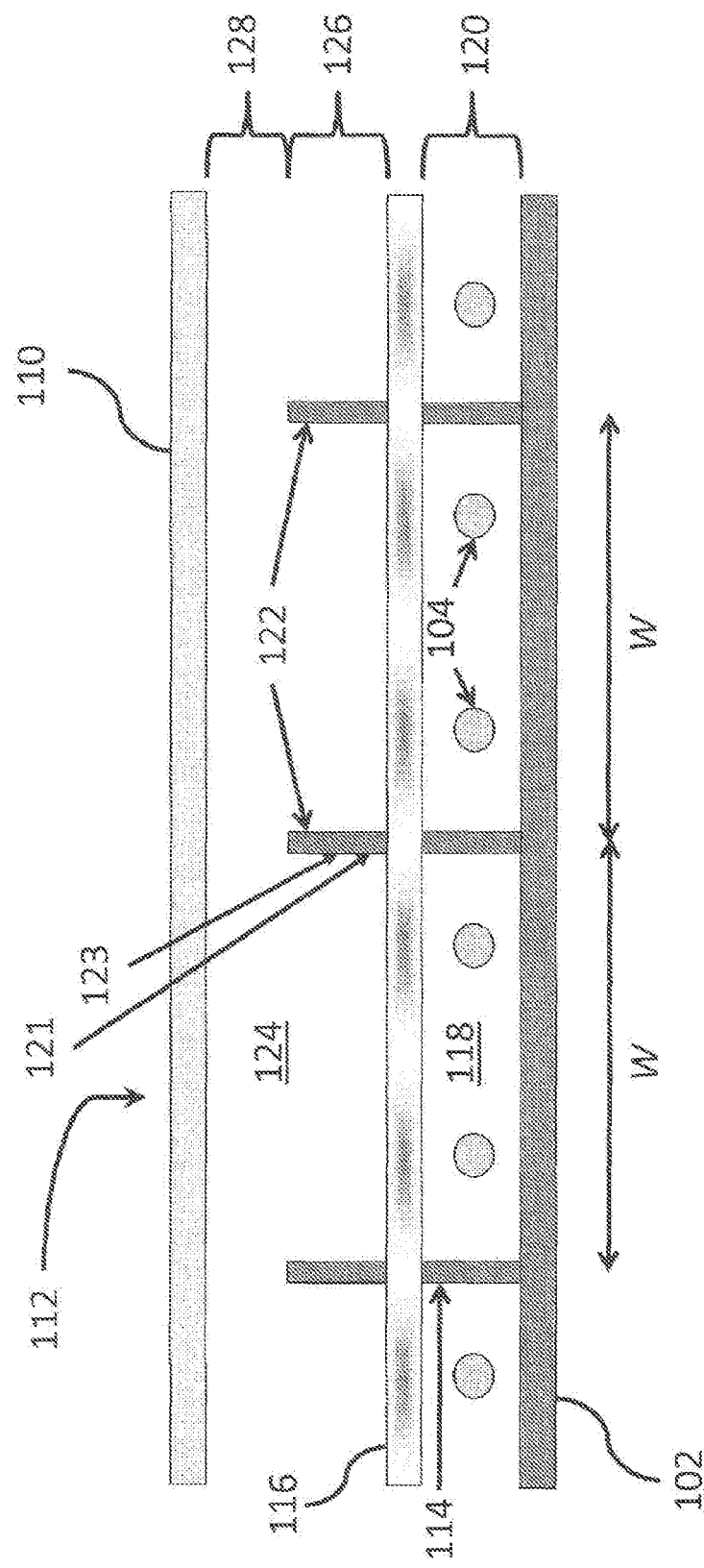
FIG. 15 of the accompanying drawings is a greatly enlarged, not to scale, cross-sectional side elevation view of an emissive display architecture with a baffled design.
Figure 16:
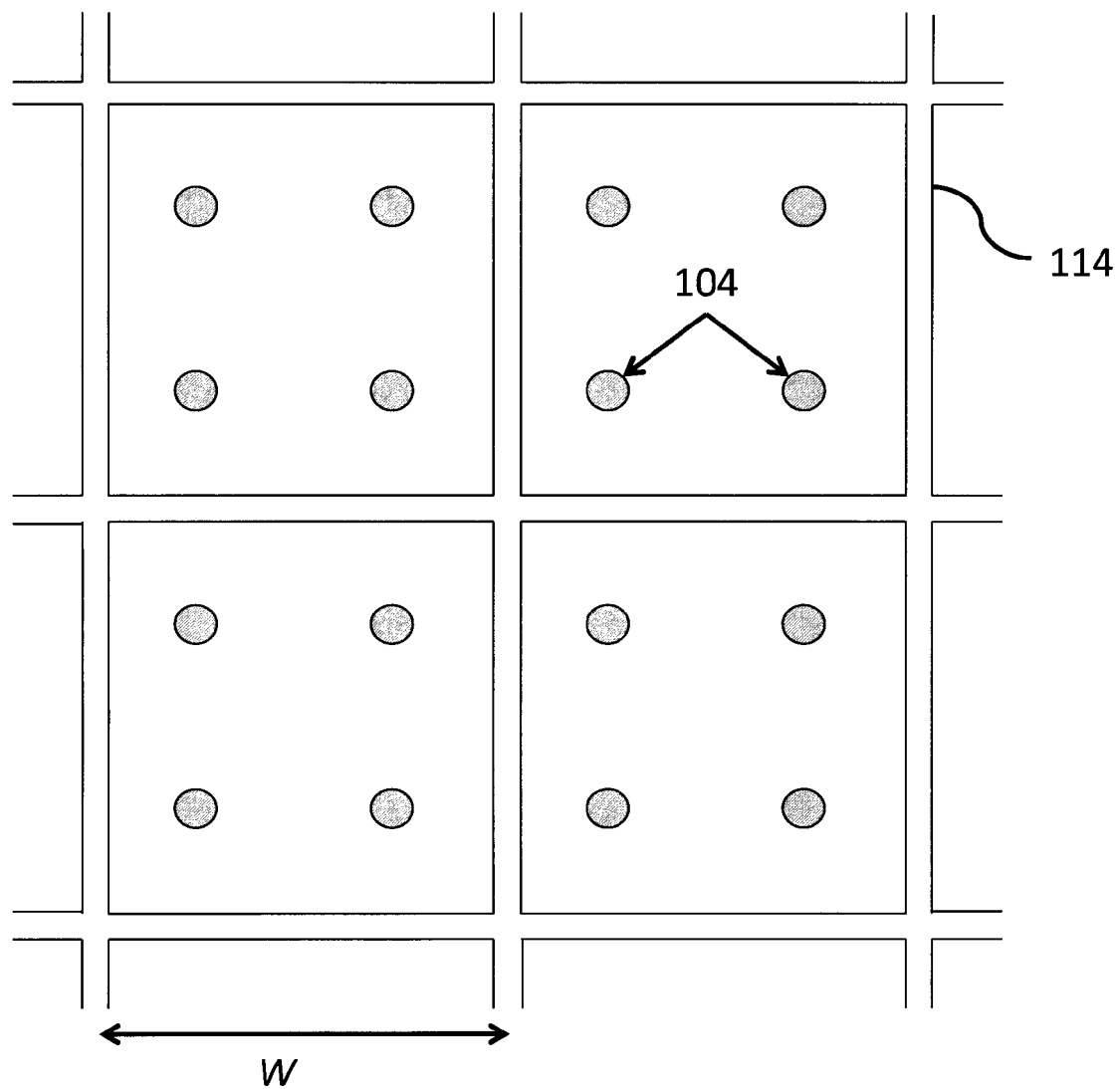
FIG. 16 of the accompanying drawings is a greatly enlarged, not to scale, cross-sectional overhead view of an array of light sources divided into individual unit cells comprising of a sub-array of 2×2 light sources within each unit cell.

A schematic cross-section illustrating the new display architecture 112 is shown in FIG. 15 first comprising of a plurality of rear cavities 120 filled with air or other low index optically clear matrix 118, further comprising of a rear backplane support 102, electric light sources 104, side walls 114, and front Lambertian transmission surface 116. The unit cell width is shown in FIG. 15 and is designated W, and labeled with a double-headed arrow. The rear backplane 102 and perpendicularly arranged side walls 114 may be composed of a polymeric material and would have a negligible transmission of less than about 5% and would have reflectance of at least about 70% such that the most of the light from the sources is able to avoid absorption or escape at surfaces 114 and 102. Additionally, in the case of multiple light sources within each rear cavity, these characteristics can ensure that all of those electric light sources produce substantially the same spatial variation of output light. The rear cavities may be arranged in square or hexagonal-like arrays. Within each cavity, the electric light sources 104 may have any spatial arrangement that optimizes efficiency or practicality of the system. They may be monochromatic light emitting diodes (LEDs) or other electric light source technologies. They may also be comprised of various colors of LEDs such as, for example, red, green and blue to be able to create a full visible color gamut. In the non-limiting illustration in FIG. 15, the light sources 104 are arranged in 2×2 arrays within a single cavity surrounded by side walls 114. Depending on the design variable, it could be envisioned that the light sources 104 could be arranged in 3×3, 4×4 or other higher order arrangements. FIG. 16 is a cross-sectional overhead view to better understand the embodiment described herein. FIG. 16 shows the cavities comprising of 2×2 groups of electric light sources 104 and their nearest neighbors surrounded by planar side walls 114. The unit cell width, for example, is shown in FIG. 16 and is designated W, and labeled with a double-headed arrow.

The front Lambertian transmission surface 116 is a key component of the invention. It is preferred that 116 have absorption less than about 20%. For the light that is transmitted, it has a Lambertian angular distribution and the transmission percentage varies with position according to a predetermined transmission function T(x,y) having, for example, with the rear cavities arranged in a square-like array (as shown in FIG. 16), have four-fold bilateral symmetry matching the symmetry of the array of baffled cavities and where x and y are measured from the center of the surface in their respective perpendicular directions. Though it is preferred that 116 is uniform in composition, it could be envisioned that a non-uniform Lambertian surface material 116 may be used but would be of no clear advantage. Some examples of material of construction for Lambertian surface material 116 may be comprised of titania or other high index particles dispersed within a continuous low index matrix polymer such as an acrylic or polycarbonate.

The display 112 in FIG. 15 is further comprised of a baffled diffusion cavity 126 which in turn is comprised of a plurality of ordered arrays of baffles 122 in air or other low index material 124 that is located adjacent to and in front of the rear cavity 120. The baffles extend perpendicularly from the Lambertian transmission surface 116 into cavity 126 at a distance determined by the design variable. Based on the preference of the design of the display and resulting desired image properties from mathematical analyses, ray trace and or experimental optimization, the length of the baffles 122, the shape of the baffles 122 and the surface properties of the baffles 122 may be preferentially tuned. The length of the baffles 122 determines the width of the cavity 126. It is preferred to keep this at about 30% of the total width of the distance from the backplane 102 to the outer front transmission light output surface 110 where the image is viewed by the viewer. The baffles 122, for example as shown in FIG. 15, are in a square-like array, though other arrangements such as a hexagonal-array may be envisioned. It is also preferred that the baffles 122 are opaque with transmission less than about 5%. The thickness of the baffles may be about 10% of the cavity width comprising the light sources 104. It is preferred that the thickness of the baffles be as small as possible. The baffles 122 may further comprise a highly reflective or retro-reflective surface. The baffles may also comprise of an inner diffuse reflective layer 121 and a second outer retro-reflective layer 123. The baffles 122 may also have a curved surface or a variable surface thickness to further direct the light output towards the front light output surface 110. For example, the baffles may be thicker at the bottom located adjacent the transmission surface 116 and become gradually thinner at the top of the baffle and towards surface 110 in a tapered fashion in order to aid in the reflection of light towards light output surface 110. The baffles may be constructed of a polymeric material.

As further shown in FIG. 15, an outer non-baffled cavity 128 is adjacent to and in front of the baffled cavity 126. The non-baffled cavity is comprised of air or other optically clear low index material 124 and an outer Lambertian light output transmission surface 110 on which an image is illuminated to be observed by the viewer. It is preferred that the width of the outer cavity 128 is about 30% of the overall width of the total width of the distance from the backplane 102 to the outer front transmission light output surface 110. Further, the front Lambertian light output surface 110 may have an absorption less than about 20% and which by means of diffusion within the surface achieves a Lambertian angular distribution for the transmitted light and wherein the transmission percentage exceeds at least about 30%.

It may be envisioned that in addition to the design architecture for a light distribution system shown in FIG. 15 and described herein further comprises a light modulating LCD panel adjacent to the front Lambertian light output surface 110 such that the light modulating LCD panel is disposed between the viewer and front Lambertian light output surface 110. In combination, for example, with electric light sources 104 comprised of monochromatic or red, green and blue LEDs that the entire backlit LED-LCD system is controlled in such a manner as to produce a high dynamic range image to be used in applications such as HDR displays for televisions, billboards and movie theatres.

Overall this approach works well and further heightens the possible application of this concept for LED displays that must appear high quality and high contrast at all viewing distances and angles. In general the design of the transmission function for the front of the rear cavities would be done by ray trace optimization, or experimental optimization, or a combination, a process that is deterministic, and not creative. The optimization algorithm simply adjusts the spatial distribution of the transmission function to minimize the visual perception of dis-uniformity of the luminance output for uniform output, linear gradients, and quadratic gradients. This always converges to one best solution, so even though this method of pre-determining the transmission function is not a single closed-form formula, it is a perfectly clear algorithm that can readily be followed by non-creative persons who have ordinary skill in the art.

Overall this approach is very promising and further heightens the possible application of this concept for LED displays that must appear high quality and high contrast at all viewing distances. A particularly interesting case could be in movie theatres. There is a possibility of producing HDR movies by using a large LED screen, much like outdoor billboard LED displays. One difficulty is that some audience members must sit quite close to the screen, so it will be important to minimize the appearance of pixels on the screen. A conventional diffuser would blur the image and would also lead to light leakage from bright regions to dark regions, which would degrade the contrast and thus limit the benefit of the HDR approach.

The approach that has been described herein for smooth backlighting of LCD screens in HDR devices could in principle also be applied to large LED screens. Basically, the individual LEDs, or RGB LED clusters, would backlight an efficient, mainly non-reflective diffuser screen, using the PSF approach described above, in order to hide the presence of the LEDs without unduly blurring the actual image content. This feature could considerably enhance the perceived optical quality of such displays.

It will be apparent to those skilled in the technology of LED, LCD, HDR and other emissive displays that numerous changes and modifications can be made in the preferred embodiments described above without departing from the scope of the invention. Accordingly, the foregoing description is to be construed in an illustrative and not in a limitative sense, the scope of the invention being defined solely by the appended claims.

What is claimed is:

1. A light distribution system to produce a smoothly varying Lambertian luminance output on an output surface that emits light in a frontward direction towards the viewer, in one or more directions perpendicular to the frontward direction to form a two dimensional array of unit cells, each unit cell comprising:
 a. a rear optical cavity further comprising:
  i. one or more electric light sources,
  ii. a rear surface with transmission less than about 5% and reflectance greater than about 70%,
  iii. a plurality of side surfaces with transmission less than about 5% and reflectance greater than about 70%,
  iv. a front Lambertian transmission surface having absorption less than about 20% and a Lambertian angular distribution for the transmitted light, wherein the front Lambertian transmission varies according to a predetermined transmission function $T(x,y)$ having a four-fold bilateral symmetry in a square unit cell array or a six-fold bilateral symmetry in a hexagonal unit cell array to substantially match the symmetry of the unit cell array and wherein x and y) are measured from the center of the front Lambertian transmission surface;

b. a baffled diffusion cavity adjacent the rear optical cavity, the baffled diffusion cavity further comprising:
   i. an optically clear medium in an interior region of the baffled diffusion cavity, the interior region of the baffled diffusion cavity defining a space having a thickness of about 30% of the width thereof, and
   ii. a baffle with an optical transmission rate of less than about 5% located on each of the four sides of the baffled diffusion cavity, with at least one baffle having a thickness of about less than about 10% of the width of the cavity; and
c. a non-baffled diffusion cavity adjacent to the baffled diffusion cavity, the non-baffled diffusion cavity further comprising:
   i. an optically clear medium, with a thickness of about 30% of the width of the cavity
   ii. a front Lambertian light output surface having absorption less than about 20% and which by means of diffusion within the front Lambertian light output surface achieves a Lambertian angular distribution for the transmitted light and wherein the transmission percentage exceeds at least about 30%
wherein the transmission function T(x,y) is predetermined by a deterministic ray trace or an experimental optimization to minimize the visual perception of dis-uniformity arising from the combination of dis-uniform light output, dis-uniform linear gradient light output variation, and dis-uniform quadratic gradient light output variation; and
wherein the baffled diffusion cavity includes baffles with a first inner diffuse reflector layer and a second outer retro-reflective layer.

2. The light distribution system according to claim 1, wherein the one or more electric light sources are multi-colored.

3. The light distribution system according to claim 2, wherein the multi-colored electric light sources of said rear optical cavity include red, green and blue light emitting diodes.

4. The light distribution system according to claim 1, wherein the rear and side surfaces of said rear optical cavity are substantially inter-reflective such that the one or more electric light sources produce substantially similar spatial variation of output light.

5. The light distribution system according to claim 1, wherein the Lambertian transmission surface of the rear optical cavity further comprise titania or particles dispersed within a continuous polymer matrix, wherein the particles have a higher reflective index relative to the polymer matrix.

6. The light distribution system according to claim 1, wherein the unit cells are arranged in a square-like or hexagonal-like array.

7. The light distribution system according to claim 1, wherein the baffled diffusion cavity comprises baffles with a reflective or a retro-reflective surface.

8. The light distribution system according to claim 1, wherein components of the unit cell interact to produce a point spread function to substantially minimize de-pixelization light spread function for the two dimensional array.

9. The light distribution system according to claim 8, that achieves a point spread function that is a minimally-spreading de-pixelization light spread function for a two dimensional light emitting array further comprising a plurality of light emitting diodes within the rear cavity.

10. The light distribution system according to claim 1, further comprising a light modulating LCD panel adjacent to the front Lambertian light output surface disposed between a viewer and the front Lambertian light output surface.

11. The light distribution system according to claim 10, that further comprising light emitting diodes as the electric light sources in the rear cavity.

12. The light distribution system according to claim 11, wherein the light emitting diodes and LCD panel are produce a high dynamic range.

13. The light distribution system according to claim 1, wherein each unit cell is configured to provide a point spread function emitting more than about 30% light from the cell, more than about 60% light from a combination of the cell and one or more immediate neighbors, and more than about 90% light from a combination of the cell and adjacent neighbors.

14. The light distribution system according to claim 1, wherein each unit cell is configured to produce a point spread function that is a minimally-spreading de-pixelization light spread function for the two dimensional light emitting array.

* * * * *